United States Patent [19]
Gorney

[11] Patent Number: 5,647,163
[45] Date of Patent: Jul. 15, 1997

[54] SWITCHABLE BLADE SPINNER FISHING LURE FOR MUSKELLUNGE AND NORTHERN PIKE

[76] Inventor: William D. Gorney, 406 Wilder Ave., Helena, Mont. 59601

[21] Appl. No.: 426,270

[22] Filed: Apr. 21, 1995

[51] Int. Cl.⁶ ................................................ A01K 85/00
[52] U.S. Cl. ................ 43/42.13; 43/42.14; 43/42.32; 43/42.28
[58] Field of Search ................ 43/43.14, 43.13, 43/42.28, 42.32, 42.45

[56] References Cited

U.S. PATENT DOCUMENTS

| 2,504,229 | 4/1950 | Sinclair | 43/42.13 |
| 3,750,325 | 8/1973 | Feltman | 43/42.14 |
| 4,329,804 | 5/1982 | Brown | 43/42.13 |
| 4,637,159 | 1/1987 | Kulis | 43/42.32 |
| 4,831,764 | 5/1989 | Jecericus | 43/42.45 |
| 5,155,948 | 10/1992 | Kitagawa | 43/42.28 |
| 5,245,782 | 9/1993 | Pahle | 43/42.32 |
| 5,355,612 | 10/1994 | Smith | 43/42.13 |

Primary Examiner—Kurt Rowan

[57] ABSTRACT

A fishing lure comprising a single, continuous piece of stainless steel wire having a bend in it, forming a closed eye forward, a spinner arm and a main shaft with the length of the spinner arm being in proportion to the main shaft in a ratio of 3 to 5, not previously used in the art. Both the main shaft and the spinner shaft have closed eyes at their ends. The spinner arm has attached to it a ball bearing swivel with a snap holding a large willow leaf spinner blade. The spinner shaft has several ruby red beads strung on it, ruby red being the sole acceptable color. A lead jig head is moulded over the main wire shaft. The head has two unique, not seen before, eye platforms with movable pupil, bubble eyes attached to the platforms which are pointing slightly downward and a neck at the back of the head one half the length of the head. The main body of the lure is formed by using a new approach of multiple (three) rubber skirts, all attached in reverse. One skirt each is attached to the neck of the jig head and to the remaining wire from the neck to the rear main shaft eye. The rear main shaft eye is joined with two (parallel mounted) split rings to the eye of a large treble hook which has mounted on its shank the third skirt.

9 Claims, 2 Drawing Sheets

SWITCHABLE BLADE SPINNER FISHING LURE FOR MUSKELLUNGE AND NORTHERN PIKE

BACKGROUND OF THE INVENTION

The present invention is similar to the original safety-pin type spinner bait, however, this Muskie and Northern Pike lure is designed not only to elicit strikes by both species but incorporates a much longer, multi-skirted body to increase the chances of hooking and landing the fish. The lure has significant differences from any other lure for the two aforementioned species of game fish or from any other lure designed for any other species with this safety-pin type design. The present invention, here-in-after referred to as the Muskie switch-blade, incorporates into the design arena a view of the fishes feeding physiology and mouth structure, giving the bait's appearance, sound and overall design a greater proclivity for getting strikes and catching fish.

DESCRIPTION OF THE PRIOR ART

The U.S. Pat. No. 5,355,612,43/42.13, Spinner fishing lure, discribes a lure that has a main body with a lead jig head and an O'Shaughnessy hook and wire in the head. The hook comes out of the lead head toward the rear of the lure and the wire comes out of the front of the lead head toward the front of the lure for a couple of inches and has an attach point eye and spinner arm with two blades attached to it. This lure has a single skirt attached to the rearward end of the lead head on a cylindrical neck that holds the skirt in place. This design displays many drawbacks for use with large fish that have long, toothy maws. Its overall length is approximately four and one-half inches.

The technology of fishing lure design for Muskies has made very little functional design advancement in the last fifty years, especially when compared to the advancements made in the bass fishing field. Lures such as jerk baits, "stick" baits, crawlers, and buck-tail spinners have been a major part of the Muskie fishing scene for at least 90 years and, in a couple of cases, over one hundred years.

SUMMARY OF THE INVENTION

The present invention is made up of medium-heavy stainless steel wire for the main shaft and a spinner arm. The spinner is a large willow leaf style blade mounted to the spinner arm with a ball bearing style on a snap swivel, for easy changeability. The willow leaf blade has a more narrow turning radius than a Colorado or Indiana Style and can spin at a more rapid pace than the other blades. This faster spin creates a higher, gentler frequency impulse in the water, more like a fleeing baitfish.

The main shaft has a closed eye at the front where the spinner arm wraps around it and a conical jig head about half way down the shaft. The shaft is considerably longer than a conventional spinner shaft to allow the bait greater length so when a large fish engulfs it, the treble hook attached at the end main shaft is in the far back of the fishes mouth or throat. If the hook is jerked when in this position it is easily driven into the jaw or back of the mouth and thus hooks the fish.

The conical jig head is pointed forward and has two, round eye platforms pointing downward, with bubble eyes on each. The eyes have movable pupils. This location allows the Muskie or Northern Pike, both being predator fish with their eyes on the top of their heads, to easily see the downward mounted eyes of the lure.

The long body of the lure behind the head allows the mounting of three living rubber skirts. The first skirt is mounted on the short cylindrical neck behind the head in reverse, the second, mounted in reverse behind the neck, is the midsection of the body, and the third is on the treble hook in the rear, and that skirt is also mounted in reverse. The three living rubber skirts give size and length to the lure not capable on the single skirted models previously introduced.

The design and structure of this lure solves, to a great extent, the two main hooking problems that exist in other previous lures.

The first problem other spinners have had is that they have a characteristically, moulded in the head, a fixed O'Shaughnessy, single hook. This hook can rotate to a horizontal position in the flat type maw of the fish and be pulled right out of the fishes mouth without ever engaging any flesh of the mouth.

The maw of these species of fish have long, bony mouths, flat forward snouts making the mouth interior flat-like. On the inside of the mouth are several rows of needle sharp teeth pointing up and rearward toward the species' throat and gullet, obviously preventing the escape of any squirming, live prey it has engulfed.

Herein lies the single largest problem in trying to hook those species. Stick baits, crawlers, baits with hard plastic bodies and some spinners are actually trapped in place in the maw of a Muskie or Northern Pike by the vise-like crushing grip of the fishes mouth and the sharp teeth embedded in the bodies of the lures holding them fast in place. Some of the hardest jerks by stiff rods and strong lines cannot dislodge the lures enough to slide them through the mouth enough to sink the hooks in the flesh of the mouth or jaw.

In the present lure, when the fish bites, the spinner arm collapses and there is virtually nothing on or about the lure that allows it to be held in place and consequently when the fisherman jerks the line the lure moves through the mouth and the treble hook is driven into the flesh inside the jaw or other soft tissues of mouth.

One more unique aspect about the lure is the presence of ruby red beads on the spinner arm portion of the lure. These are round, multi-faceted beads alternating with elongated spaghetti beads. This simulates the blood of an injured, struggling bait fish. Dr. Lauren Hill, a professor of Zoology at The University of Oklahoma specializing in Ichthyology, has stated that he feels all baits should have some red on the them because it probably represents blood of an injured prey to the fish and the color red may possibly have sexual connotations.

BRIEF DESCRIPTION OF THE DRAWINGS

The present invention will be more fully understood by reference to the following detailed description thereof when read in conjunction with the attached drawings, and wherein.

DETAILED DESCRIPTION OF THE DRAWINGS

Figure 1:
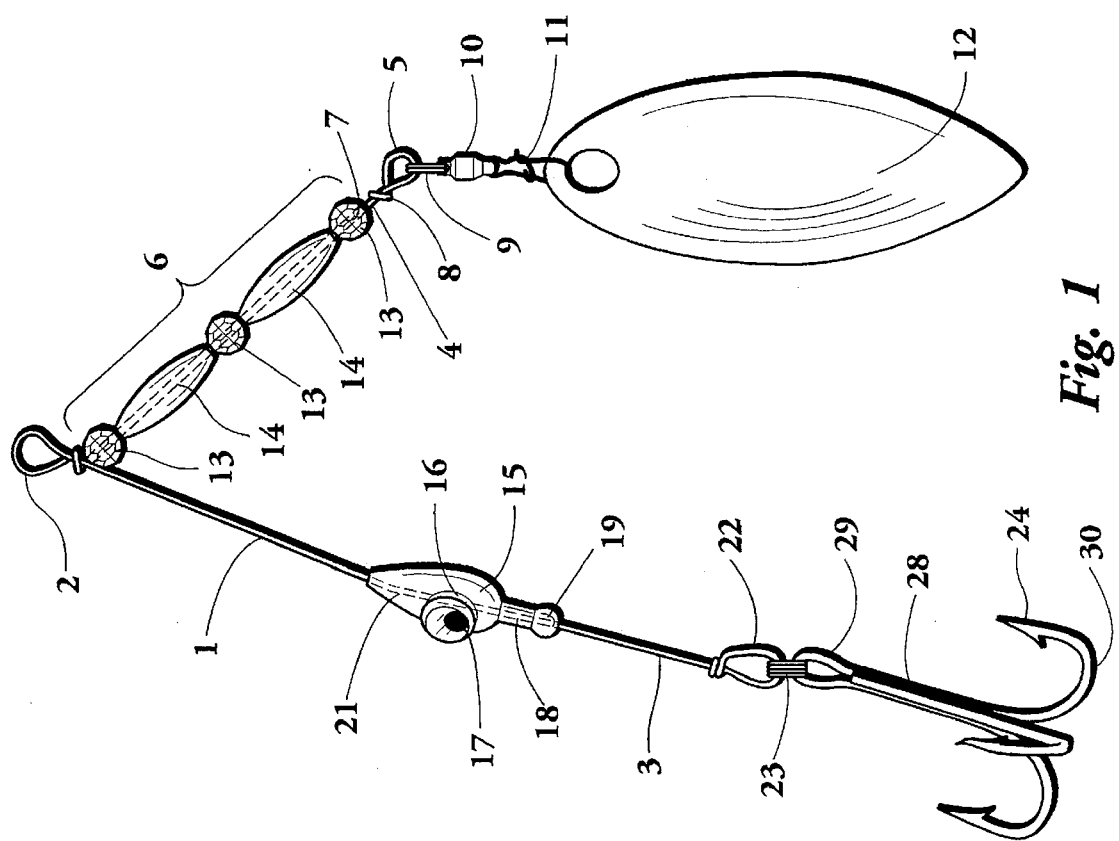
FIG. 1 is a side view of the present invention without the three skirts attached.

The fishing lure for Muskie and Northern Pike as shown in FIG. 1 includes a single, continuous, stainless steel wire formed into a main shaft 1 and a shorter spinner arm 4. Main shaft 1 and spinner arm 4 are separated by a closed eye 2. Closed eye 2 measures 3/16 of an inch in diameter and comprises a 360 degree bend around the main shaft 1. At the end of the spinner arm 4 another closed eye 5 is formed after five ruby red beads 6 are strung on the arm through holes 7 in their center. The closed eye 5 on the end of the spinner shaft is formed with a 360 degree wrap 8 around the spinner arm 4. This closed eye 5 on the end of of the spinner arm has a split ring 9 through it that is attached to a ball bearing swivel 10 which has a Duo-lock snap 11 holding a willow blade 12. This allows blades to be interchanged by opening the snap 11, removing the blade 12 and replacing it with a different blade.

The spinner arm 4 portion of the lure has five ruby red beads 6 strung onto the spinner arm 4 through the holes in their center 7. The beads are alternating round multi-faceted beads 13 and smooth spaghetti beads 14 with there being three round beads and two spaghetti beads.

The main shaft 1 includes a lead conical shaped jig head 15. This jig head is molded on the main shaft 1. Toward the rear of the head are two unique, downward pointing eye platforms 16 that have mounted on them movable pupil eyes 17. The platforms 16 protrude from the sides of the head and point 30 degrees downward from the plane of the main shaft 1. The platforms 16 are at the rear of the head 15.

Figure 2:
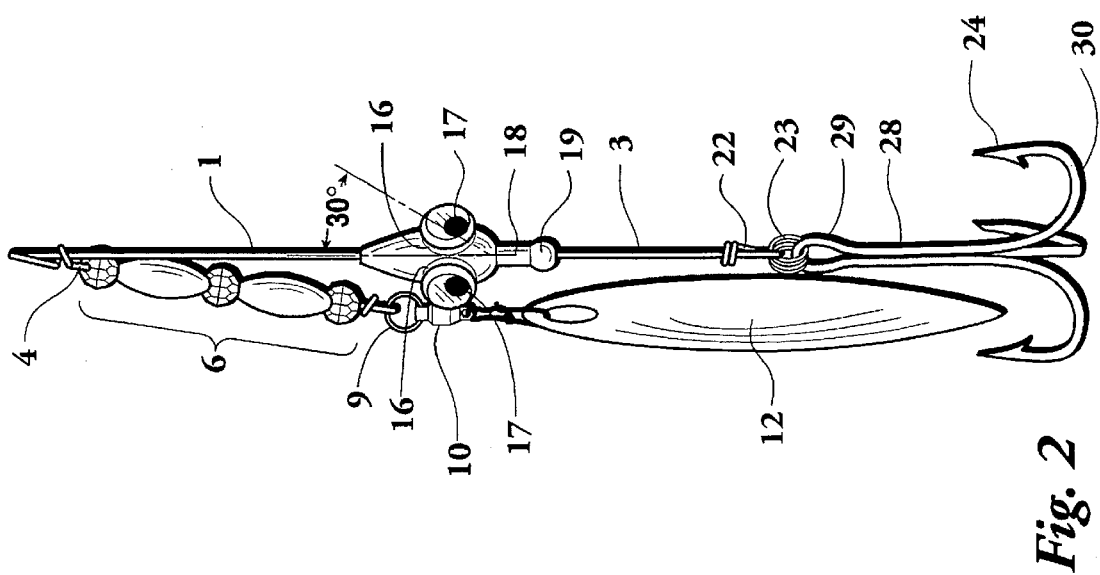
FIG. 2 is a bottom view of the present invention exposing both movable bubble eyes, with the lure turned slightly to the side to give a view of the round eye platforms protruding from the head. No skirts are shown on this figure either.

Behind the eyes 17, is a cylindrical neck 18 which is ½ the length of the head 15. FIG. 2 shows the neck 18 is ¼th the diameter of the head 15 and is a moulded part of the head 15. The neck 18 has at its rear most end a skirt keeper 19 that is 1/16 of an inch larger in diameter than the neck 18 and 1/8th of an inch long. The skirt keeper 19 serves to hold the forward skirt 20 on. Before the lead jig head 15 is moulded on the main shaft 1 of the lure there is a slight 7.5 degree bend 21 made in the main shaft as shown as broken lines thru the jig head in FIG. 1. This bend is in the same plane as the main shaft 1 and the spinner arm 4. The bend is formed by bending the rear half of the main shaft 1 toward the spinner arm 4.

The main shaft 1 exits from the neck 18 and extends rearward to a terminus, which is a closed eye 22. This closed eye 22 is formed the same way as the closed eye 5 on the end of the spinner arm 4. This comprises using the last inch of the end of the main shaft 1, forming a circular loop measuring 3/16ths of an inch, and finishing with the end of the wire wrapped 360 degrees around the main shaft 1. This closed eye has two split rings 23 attached to it, and split rings 23 also have a large treble hook 24 attached to them.

Figure 3:
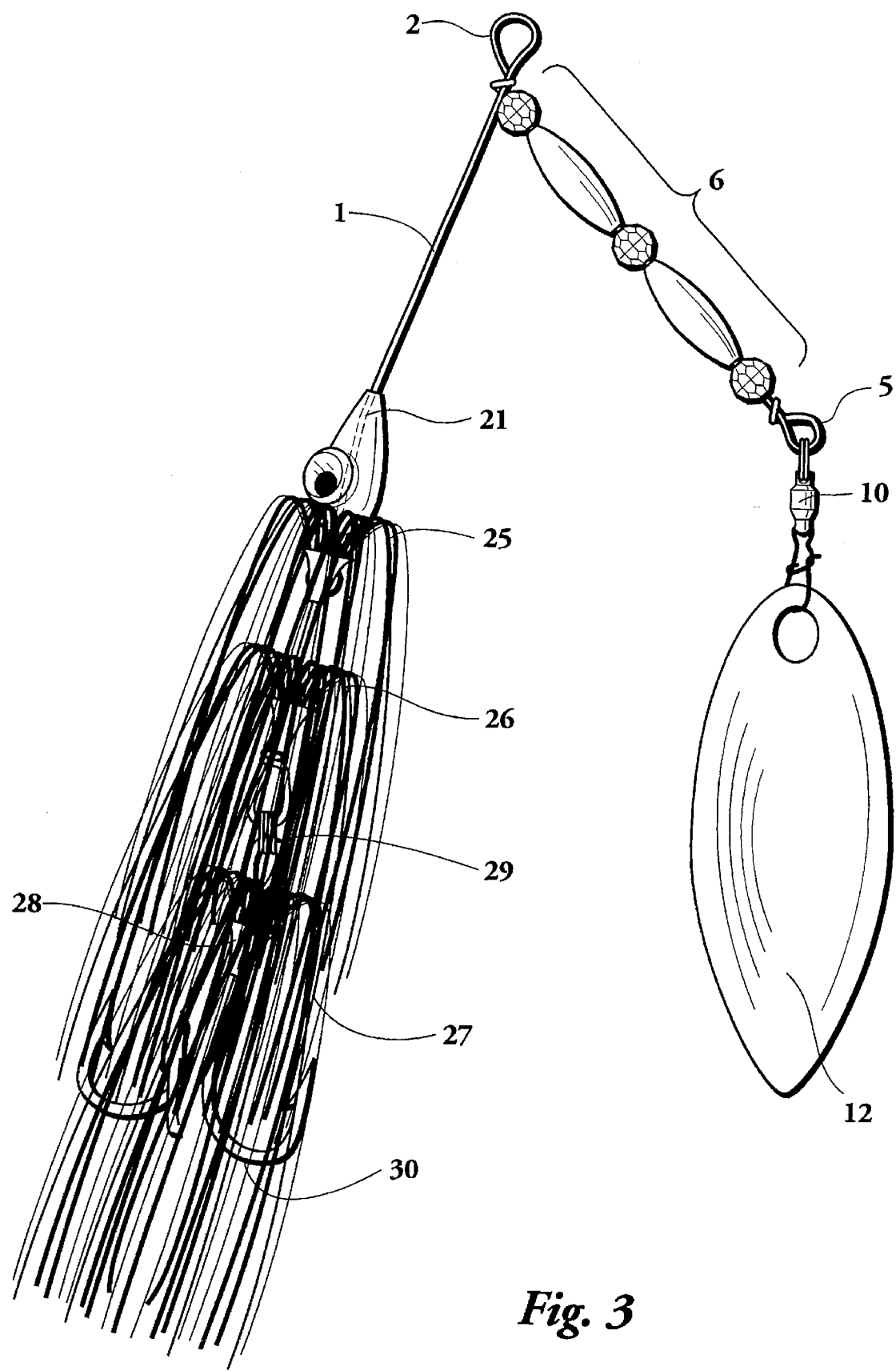
FIG. 3 is a side view of the present invention, with skirts attached, in its entirety.

FIG. 3 shows the completed switch-blade lure with skirts attached and the painted jig head 15. The forward most living rubber skirt 25 slides over the neck in reverse and is held in place by the skirt keeper. The middle skirt 26 is placed on the main shaft 1 in reverse just behind the forward skirt 25 and held in place by the rear, main shaft closed eye 22 and the split rings 23 on that eye. The third living rubber skirt 27 is pushed onto the treble hook shank 28 halfway down the shank from the hook eye 29 and the hooks outer bend 30. This living rubber skirt 27 is also mounted in reverse.

I claim:

1. A spinner fishing lure comprising:

an elongate wire main shaft having a first and second end;

a jig head disposed on the main shaft intermediate the first and second end, wherein the jig head is disposed on the main shaft in closer proximity to the midpoint of the main shaft than to the second end of the main shaft; and, wherein the jig head includes two round eye platforms facing down approximately 30 degrees from a horizontal plane; and, an eye including a moveable pupil attached to each eye platform;

a multiple hook having a shank attached to the second end of the main shaft;

at least one living rubber skin disposed on the main shaft between the jig head and the second end, wherein the main shaft between the jig head and the second end of the main shaft, as well as the multiple hook, are substantially concealed by the at least one living rubber skin;

a spinner arm having a first and second end, the first end attached to the main shaft;

a spinner blade attached to the second end of the spinner arm.

2. The spinner fishing lure of claim 1, wherein the main shaft includes two living skirts disposed on the main shaft intermediate the jig head and the second end of the wire main shaft.

3. The spinner fishing lure of claim 2, wherein a the living skirts are disposed in a reversed orientation.

4. The spinner fishing lure of claim 2, wherein the multiple hook additionally includes a living skirt disposed on the shank of the multiple hook.

5. The spinner fishing lure of claim 4, wherein the living skirt is disposed in a reversed orientation.

6. The spinner fishing lure of claim 1, wherein the multiple hook is attached to the main shaft with split rings.

7. The spinner fishing lure of claim 1, wherein the spinner blade is attached to the spinner arm by a ball bearing swivel attachment.

8. This spinner fishing lure of claim 1, further comprising red beads disposed on the spinner arm between the first and second end of the spinner arm.

9. The spinner fishing lure of claim 1, wherein the jig head is conical.

* * * * *